US012100297B1

(12) United States Patent
Ismail

(10) Patent No.: US 12,100,297 B1
(45) Date of Patent: Sep. 24, 2024

(54) DESIGNING A SMART SYSTEM TO EVAPORATE RAINWATER IN LOW-LYING AREAS OF STREETS THAT DO NOT HAVE A RAIN DRAINAGE SYSTEM

(71) Applicant: KING FAISAL UNIVERSITY, Al-Ahsa (SA)

(72) Inventor: Abdelrahim Fathy Ismail, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/429,748

(22) Filed: Feb. 1, 2024

(51) Int. Cl.

| | |
|---|---|
| ***B01D 1/04*** | (2006.01) |
| ***G08G 1/095*** | (2006.01) |
| ***G08G 9/00*** | (2006.01) |
| ***G08G 99/00*** | (2006.01) |

(52) U.S. Cl.
CPC ............... *G08G 1/095* (2013.01); *G08G 9/00* (2013.01); *G08G 99/00* (2013.01)

(58) Field of Classification Search
None
See application file for complete search history.

(56) References Cited

U.S. PATENT DOCUMENTS

| | | | | |
|---|---|---|---|---|
| 6,276,872 | B1 | 8/2001 | Schmitt | |
| 2021/0380436 | A1* | 12/2021 | Eshelman | F02C 6/18 |
| 2022/0098057 | A1* | 3/2022 | Bolton | C02F 1/008 |
| 2022/0356078 | A1* | 11/2022 | Juranitch | B01D 1/16 |
| 2023/0022856 | A1* | 1/2023 | Shiner | C02F 1/66 |
| 2024/0003542 | A1* | 1/2024 | Mergler | F23C 7/06 |

FOREIGN PATENT DOCUMENTS

| | | |
|---|---|---|
| CN | 208748469 U | 4/2019 |
| CN | 212612132 U | 2/2021 |
| CN | 215906673 U | 2/2022 |
| CN | 216275474 U | 4/2022 |

(Continued)

OTHER PUBLICATIONS

Merrifield. "Under-road heating system to keep highways ice-free", Phys. Org. Website, First available online on Jan. 30, 2019.

(Continued)

*Primary Examiner* — John F Mortell
(74) *Attorney, Agent, or Firm* — Nath, Goldberg & Meyer; Joshua B. Goldberg

(57) ABSTRACT

A smart water evaporation system can include a central control unit configured to be in communication with a plurality of thermal rods, a plurality of retractable barriers, and at least one sensor; wherein the central control unit is configured to: retrieve at least one signal from the at least one sensor when the at least one sensor detects an upper limit water level and a lower limit water level; activate the plurality of retractable barriers and the plurality of thermal rods in response to the detected upper limit water level from the at least one sensor being greater than or equal to a preset upper limit water level; and deactivate the plurality of retractable barriers and the plurality of thermal rods in response to the detected lower limit water level from the at least one sensor being less than or equal to a preset lower limit water level.

20 Claims, 1 Drawing Sheet

(56) References Cited

FOREIGN PATENT DOCUMENTS

| | | | |
|---|---|---|---|
| DE | 4115476 | A1 | 10/1991 |
| JP | H0540305 | U | 6/1993 |
| JP | 2012141840 | A | 7/2012 |
| KR | 102349824 | B1 | 2/2022 |

OTHER PUBLICATIONS

Liu, et al., "Modeling snow melting on heated pavement surfaces. Part I: Model development", Applied Thermal Engineering, vol. 27, Issues 5-6, 2007, pp. 1115-1124, First available online on Oct. 12, 2006.

* cited by examiner

100
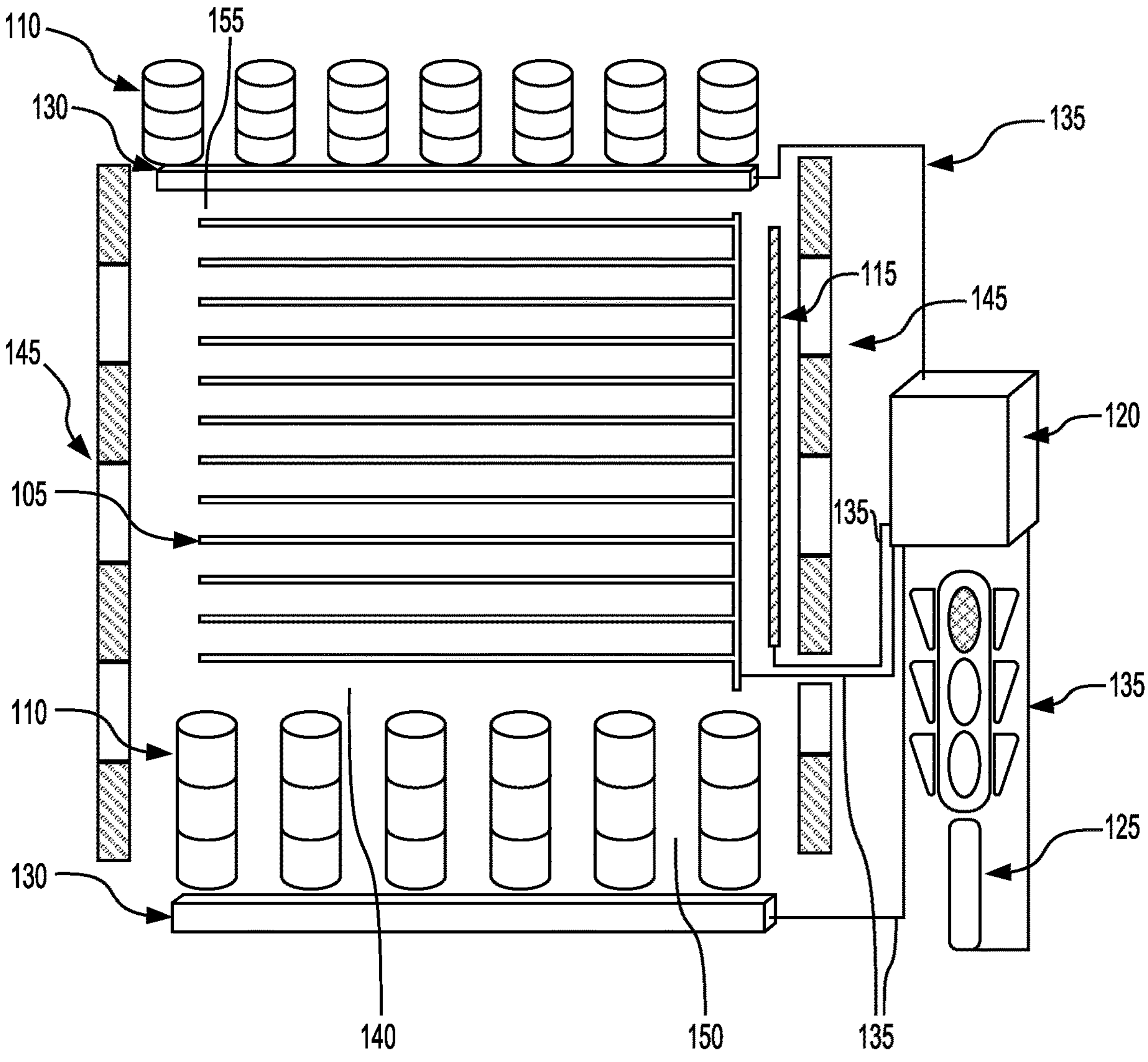

DESIGNING A SMART SYSTEM TO EVAPORATE RAINWATER IN LOW-LYING AREAS OF STREETS THAT DO NOT HAVE A RAIN DRAINAGE SYSTEM

FIELD AND BACKGROUND

The disclosure of the present application relates to a smart water evaporation system, and particularly to a system and method for evaporating water.

DESCRIPTION OF THE PRIOR ART

Streets are among the most important parts of the infrastructure of any city, allowing people and goods to get from point A to point B. They are used for driving, biking, and walking. Vehicles such as automobiles, trucks, and motorcycles are used on streets as throughfares to transport people and goods. Bicyclists also use streets to travel from one place to the next. People walk across streets to get to their destination.

Due to their impact on our everyday life, it is important that streets are easily accessible. However, with the increasing severe weather occurring worldwide, water accumulation in streets has been a serious problem. Severe weather such as hurricanes and torrential rain have caused urban flooding to occur. Such flooding events can cause water to rapidly fill the streets. While most streets are designed to be part of a flood retention system, if a drainage capacity of a storm sewer system is overwhelmed, the rainwater will fill the streets. Areas where a storm sewer system is lacking, deteriorating, or insufficient are more susceptible to street flooding. The accumulation of rainwater in the streets can be a potential problem for vehicles. If the rainwater accumulates to a dangerously high level, vehicles travelling through flooded streets can be immobilized. Vehicle occupant(s) can also be trapped inside their vehicle which may result in drowning.

In light of the above, a need remains for controlling water accumulation in streets and preventing vehicles from entering flooded streets by providing a smart water evaporation system.

SUMMARY

The present subject matter relates to a smart water evaporation system which, in one embodiment, includes a plurality of thermal rods configured to evaporate water; a plurality of retractable barriers configured to extend and retract; at least one sensor configured to detect a water level; a central control unit configured to be in communication with the plurality of thermal rods, the plurality of retractable barriers, and the at least one sensor; wherein the central control unit can be configured to: retrieve at least one signal from the at least one sensor when the at least one sensor detects an upper limit water level and a lower limit water level; activate the plurality of retractable barriers in response to the detected upper limit water level from the at least one sensor being greater than or equal to a preset upper limit water level; activate the plurality of thermal rods in response to the detected upper limit water level from the at least one sensor being greater than or equal to a preset upper limit water level; deactivate the plurality of retractable barriers in response to the detected lower limit water level from the at least one sensor being less than or equal to a preset lower limit water level; and deactivate the plurality of thermal rods in response to the detected lower limit water level from the at least one sensor being less than or equal to a preset lower limit water level.

In an embodiment, the system can further include at least one traffic light comprising a red light and a green light; the at least one traffic light can be configured to be in communication with the central control unit; wherein the central control unit can be further configured to: activate the at least one traffic light to turn on the red light in response to the detected upper limit water level from the at least one sensor being greater than or equal to a preset upper limit water level; and activate the at least one traffic light to turn on the green light in response to the detected lower limit water level from the at least one sensor being less than or equal to a preset lower limit water level.

In an embodiment, the activation and deactivation of the plurality of retractable barriers can cause the plurality of retractable barriers to extend and retract vertically, respectively.

In another embodiment, the activation and deactivation of the plurality of thermal rods can cause the plurality of thermal rods to turn on and turn off, respectively.

In another embodiment, the activation of the plurality of retractable barriers and the at least one traffic light to turn on the red light can occur simultaneously prior to the activation of the plurality of thermal rods.

In a further embodiment, the deactivation of the plurality of retractable barriers and the activation of the at least one traffic light to turn on the green light can occur simultaneously after a preset duration after the deactivation of the plurality of thermal rods.

In an embodiment, the preset duration can be about 20 minutes or more.

In an embodiment, each of the plurality of thermal rods can be connected to an electrical conductor configured to boil the water at high temperatures thereby evaporating the water.

In an embodiment, each of the plurality of retractable barriers can have a hydraulic motor and each of the hydraulic motors can be connected to an electrical connector.

In another embodiment, the at least one sensor can be an ultrasonic sensor, a pressure sensor, or a combination thereof.

In an embodiment, the at least one sensor is an ultrasonic sensor.

In a further embodiment, the present subject matter relates to a method of using the above smart water evaporation system, wherein the method includes detecting the upper limit water level by the at least one sensor; sending at least one signal from the at least one sensor to the central control unit; activating the plurality of retractable barriers via the central control unit to cause the plurality of retractable barriers to extend vertically in response to the detected upper limit water level from the at least one sensor being greater than or equal to the preset upper limit water level; activating the plurality of thermal rods via the central control unit to cause the plurality of thermal rods to turn on in response to the detected upper limit water level from the at least one sensor being greater than or equal to the preset upper limit water level; detecting the lower limit water level by the at least one sensor; sending at least one signal from the at least one sensor to the central control unit; deactivating the plurality of retractable barriers via the central control unit to cause the plurality of retractable barriers to retract vertically in response to the detected lower limit water level from the at least one sensor being less than or equal to the preset lower limit water level; and deactivating the plurality of thermal rods via the central control unit to cause the plurality of thermal rods to turn off in response to the detected lower limit water level from the at least one sensor being less than or equal to the preset lower limit water level.

In an embodiment, the upper limit water level can be greater than about 10 cm and the lower limit water level can be about 10 cm or less.

In an embodiment, the plurality of retractable barriers can be made of iron coated with stainless steel and wherein the retractable barriers can be about 20 cm to about 30 cm high in the extended position.

These and other features of the present subject matter will become readily apparent upon further review of the following specification.

BRIEF DESCRIPTION OF DRAWINGS

FIG. 1 depicts the overall smart water evaporation system.

DETAILED DESCRIPTION

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

FIG. 1 depicts, in an embodiment, a smart water evaporation system (100) which includes a plurality of thermal rods (105) which can be configured to evaporate water (not shown). A plurality of retractable barriers (110) are shown, which can be configured to extend and retract. At least one sensor (115) is present, which can be configured to detect a water level. At least one traffic light (125) is shown comprising at least a red light and a green light. A central control unit (120) can be configured to be in communication with the plurality of thermal rods (105), the plurality of retractable barriers (110), the at least one sensor (115), and the at least one traffic light (125). The central control unit (120) can be configured to: retrieve at least one signal from the at least one sensor (115) when the at least one sensor (115) detects an upper limit water level and a lower limit water level; activate the plurality of retractable barriers (110) in response to the detected upper limit water level from the at least one sensor (115) being greater than or equal to a preset upper limit water level; activate the plurality of thermal rods (105) in response to the detected upper limit water level from the at least one sensor (115) being greater than or equal to a preset upper limit water level; and activate the at least one traffic light (125) to turn on the red light in response to the detected upper limit water level from the at least one sensor (115) being greater than or equal to a preset upper limit water level.

The central control unit (120) can be further configured to: deactivate the plurality of retractable barriers (110) in response to the detected lower limit water level from the at least one sensor (115) being less than or equal to a preset lower limit water level; deactivate the plurality of thermal rods (105) in response to the detected lower limit water level from the at least one sensor (115) being less than or equal to a preset lower limit water level; and activate the at least one traffic light (125) to turn on the green light in response to the detected lower limit water level from the at least one sensor (115) being less than or equal to a preset lower limit water level.

The activation and deactivation of the plurality of retractable barriers (110) can cause the plurality of retractable barriers (110) to extend and retract vertically, respectively. The activation and deactivation of the plurality of thermal rods (105) can cause the plurality of thermal rods (105) to turn on and turn off, respectively. The activation of the plurality of retractable barriers (110) and the at least one traffic light (125) to turn on the red light can occur simultaneously prior to the activation of the plurality of thermal rods (105). The deactivation of the plurality of retractable barriers (110) and the activation of the at least one traffic light (125) to turn on the green light can occur simultaneously after a preset duration after the deactivation of the plurality of thermal rods (105). In a non-limiting embodiment, the preset duration can be about 20 minutes or more.

In an embodiment, each of the plurality of thermal rods (105) can be connected to an electrical conductor (not shown) which can be configured to boil the water at high temperatures thereby evaporating the water. In a particular non-limiting embodiment, the high temperatures can be about 100° C. or more. In some non-limiting embodiments, the plurality of thermal rods (105) can evaporate the water within about 1 hour or less. In certain non-limiting embodiments, the plurality of thermal rods (105) can be made of metal and the thickness of the plurality of thermal rods (105) can be about 5 cm or less.

In a particular non-limiting embodiment, the plurality of retractable barriers (110) can be made of iron coated with stainless steel and wherein the retractable barriers (110) can be about 20 cm to about 30 cm high in the extended position. In an embodiment, each of the plurality of retractable barriers (110) can have a hydraulic motor (130) and each of the hydraulic motors (130) can be connected to an electrical connector (not shown). Each of the hydraulic motors (130) can be built into each of the plurality of retractable barriers (110).

In an embodiment, the at least one sensor (115) can be an ultrasonic sensor, a pressure sensor, or a combination thereof. In an embodiment, the at least one sensor (115) is the ultrasonic sensor. The pressure sensor relies on measuring a depth pressure of the water (water level) above the pressure sensor. On the other hand, the ultrasonic sensor can send sound pulses through the air towards the surface of the water. When the sound pulses strike the surface of the water, the signal can bounce off the water and reflect back to the ultrasonic sensor. Based on the distance between the ultrasonic sensor and the water surface, the water level can be calculated. In some embodiments, the least one sensor (115) can be a plurality of sensors (115) to cover the water accumulation of a large area. In certain embodiments, the least one sensor (115) can be a single sensor (115) to cover the water accumulation of a small area.

In an embodiment, the control unit (120) can be connected to the plurality of thermal rods (105), the plurality of retractable barriers (110), the at least one sensor (115), and the at least one traffic light (125) via cable wires (135) to provide the communication described herein.

The present subject matter relates to a method of using the smart water evaporation system (100). The method includes detecting the upper limit water level by the at least one sensor (115); sending at least one signal from the at least one sensor (115) to the central control unit (120); activating the plurality of retractable barriers (110) via the central control unit (120) to cause the plurality of retractable barriers (110) to extend vertically in response to the detected upper limit water level from the at least one sensor (115) being greater than or equal to the preset upper limit water level; activating the plurality of thermal rods (105) via the central control unit (120) to cause the plurality of thermal rods (105) to turn on in response to the detected upper limit water level from the at least one sensor (115) being greater than or equal to the preset upper limit water level; activating the at least one traffic light (125) to turn on the red light via the central control unit (120) in response to the detected upper limit water level from the at least one sensor (115) being greater than or equal to a preset upper limit water level; detecting the lower limit water level by the at least one sensor (115); sending at least one signal from the at least one sensor (115) to the central control unit (120); deactivating the plurality of retractable barriers (110) via the central control unit (120) to cause the plurality of retractable barriers (110) to retract vertically in response to the detected lower limit water level from the at least one sensor (115) being less than or equal to the preset lower limit water level; deactivating the plurality of thermal rods (105) via the central control unit (120) to cause the plurality of thermal rods (105) to turn off in response to the detected lower limit water level from the at least one sensor (115) being less than or equal to the preset lower limit water level; and activating the at least one traffic light (125) to turn on the green light via the central control unit (120) in response to the detected lower limit water level from the at least one sensor (115) being less than or equal to a preset lower limit water level. In a non-limiting embodiment, the upper limit water level can be greater than about 10 cm and the lower limit water level can be about 10 cm or less.

As shown in FIG. 1, the plurality of thermal rods (105) can be installed on the surfaces of a street (140). In a non-limiting embodiment, the installation of the plurality of thermal rods (105) can be installed horizontally between the sides of the street (145). The plurality of retractable barriers (110) can be installed at a front end (150) and a back end (155) of the street (140). When the plurality of retractable barriers (110) is in the extended position, vehicles can be prevented from entering the street (140). On the other hand, when the plurality of retractable barriers (110) is in the retracted position, vehicles can enter the street (140).

When the at least one sensor (115) is an ultrasonic sensor, the at least one sensor (115) can be installed longitudinally parallel to a side of the street (145). On the other hand, when the at least one sensor (115) is a pressure sensor, the at least one sensor (115) can be installed longitudinally parallel and/or longitudinally perpendicular to the sides of the street (145). The at least one traffic light (125) can be installed at the front end (150) and/or at the back end (155) of the street (140). The at least one traffic light (125) can provide guidance to vehicle drivers. In the case of the at least one traffic light (125) turning on the red light, vehicle drivers would be discouraged from entering the street (140). When the at least one traffic light (125) turns on the green light, vehicle drivers can access the street (140). The central control unit (120) can be installed in a vicinity of the street (140). In a non-limiting embodiment, the water can be rainwater or any other sources of water that can flood the street (140).

It is to be understood that the smart water evaporation system and the method of using the smart water evaporation system are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A smart water evaporation system, the system comprising:

a plurality of thermal rods configured to evaporate water;

a plurality of retractable barriers configured to extend and retract;

at least one sensor configured to detect water level;

a central control unit configured to be in communication with the plurality of thermal rods, the plurality of retractable barriers, and the at least one sensor;

wherein the central control unit is configured to:

retrieve at least one signal from the at least one sensor when the at least one sensor detects an upper limit water level and a lower limit water level;

activate the plurality of retractable barriers in response to the detected upper limit water level from the at least one sensor being greater than or equal to a preset upper limit water level;

activate the plurality of thermal rods in response to the detected upper limit water level from the at least one sensor being greater than or equal to a preset upper limit water level;

deactivate the plurality of retractable barriers in response to the detected lower limit water level from the at least one sensor being less than or equal to a preset lower limit water level; and deactivate the plurality of thermal rods in response to the detected lower limit water level from the at least one sensor being less than or equal to a preset lower limit water level.

2. The smart water evaporation system of claim 1, further comprising:

at least one traffic light comprising a red light and a green light;

the at least one traffic light configured to be in communication with the central control unit;

wherein the central control unit is further configured to:

activate the at least one traffic light to turn on the red light in response to the detected upper limit water level from the at least one sensor being greater than or equal to a preset upper limit water level;

and activate the at least one traffic light to turn on the green light in response to the detected lower limit water level from the at least one sensor being less than or equal to a preset lower limit water level.

3. The smart water evaporation system of claim 2, wherein the activation and deactivation of the plurality of retractable barriers cause the plurality of retractable barriers to extend and retract vertically, respectively.

4. The smart water evaporation system of claim 3, wherein the activation and deactivation of the plurality of thermal rods cause the plurality of thermal rods to turn on and turn off, respectively.

5. The smart water evaporation system of claim 4, wherein the activation of the plurality of retractable barriers and the at least one traffic light to turn on the red light occur simultaneously prior to the activation of the plurality of thermal rods.

6. The smart water evaporation system of claim 4, wherein the deactivation of the plurality of retractable barriers and the activation of the at least one traffic light to turn on the green light occur simultaneously after a preset duration after the deactivation of the plurality of thermal rods.

7. The smart water evaporation system of claim 1, wherein each of the plurality of thermal rods are connected to an electrical conductor configured to boil the water at high temperatures thereby evaporating the water.

8. The smart water evaporation system of claim 1, wherein each of the plurality of retractable barriers are comprised of a hydraulic motor and each of the hydraulic motors are connected to an electrical connector.

9. The smart water evaporation system of claim 1, wherein the at least one sensor comprise an ultrasonic sensor, a pressure sensor, or a combination thereof.

10. A method of using the smart water evaporation system of claim 1, the method comprising:

detecting the upper limit water level by the at least one sensor;

sending at least one signal from the at least one sensor to the central control unit;

activating the plurality of retractable barriers via the central control unit to cause the plurality of retractable barriers to extend vertically in response to the detected upper limit water level from the at least one sensor being greater than or equal to the preset upper limit water level;

activating the plurality of thermal rods via the central control unit to cause the plurality of thermal rods to turn on in response to the detected upper limit water level from the at least one sensor being greater than or equal to the preset upper limit water level;

detecting the lower limit water level by the at least one sensor;

sending at least one signal from the at least one sensor to the central control unit;

deactivating the plurality of retractable barriers via the central control unit to cause the plurality of retractable barriers to retract vertically in response to the detected lower limit water level from the at least one sensor being less than or equal to the preset lower limit water level; and deactivating the plurality of thermal rods via the central control unit to cause the plurality of thermal rods to turn off in response to the detected lower limit water level from the at least one sensor being less than or equal to the preset lower limit water level.

11. The method of using the smart water evaporation system of claim 10, wherein the upper limit water level is greater than about 10 cm and the lower limit water level is about 10 cm or less.

12. The method of using the smart water evaporation system of claim 10, further comprising:

at least one traffic light comprising a red light and a green light;

the at least one traffic light is configured to be in communication with the central control unit;

the method further comprising:

activating the at least one traffic light to turn on the red light via the central control unit in response to the detected upper limit water level from the at least one sensor being greater than or equal to the preset upper limit water level;

and activating the at least one traffic light to turn on the green light via the central control unit in response to the detected lower limit water level from the at least one sensor being less than or equal to the preset lower limit water level.

13. The method of using the smart water evaporation system of claim 12, wherein the activation of the plurality of retractable barriers and the at least one traffic light to turn on the red light occur simultaneously prior to the activation of the plurality of thermal rods.

14. The method of using the smart water evaporation system of claim 12, wherein the deactivation of the plurality of retractable barriers and the activation of the at least one traffic light to turn on the green light occur simultaneously after a preset duration after the deactivation of the plurality of thermal rods.

15. The method of using the smart water evaporation system of claim 14, wherein the preset duration is about 20 minutes or more.

16. The method of using the smart water evaporation system of claim 10, wherein each of the plurality of thermal rods are connected to an electrical conductor configured to boil the water at high temperatures thereby evaporating the water.

17. The method of using the smart water evaporation system of claim 10, wherein each of the plurality of retractable barriers are comprised of a hydraulic motor and each of the hydraulic motors are connected to an electrical connector.

18. The method of using the smart water evaporation system of claim 10, wherein the at one sensor comprise an ultrasonic sensor, a pressure sensor, or a combination thereof.

19. The method of using the smart water evaporation system of claim 18, wherein the at least one sensor is the ultrasonic sensor.

20. The method of using the smart water evaporation system of claim 10, wherein the plurality of retractable barriers are made of iron coated with stainless steel and wherein the retractable barriers are about 20 cm to about 30 cm high in the extended position.

* * * * *